United States Patent
Ballard

(10) Patent No.: US 10,208,239 B2
(45) Date of Patent: Feb. 19, 2019

(54) METHOD OF REMOVING WATER-BASED FILTER CAKE

(75) Inventor: David Anthony Ballard, Aberdeenshire (GB)

(73) Assignee: M-I Drilling Fluids UK Ltd, Aberdeen (GB)

(*) Notice: Subject to any disclaimer, the term of this patent is extended or adjusted under 35 U.S.C. 154(b) by 679 days.

(21) Appl. No.: 13/807,668

(22) PCT Filed: Jun. 24, 2011

(86) PCT No.: PCT/GB2011/051199
§ 371 (c)(1),
(2), (4) Date: Apr. 12, 2013

(87) PCT Pub. No.: WO2012/001396
PCT Pub. Date: Jan. 5, 2012

(65) Prior Publication Data
US 2013/0210684 A1    Aug. 15, 2013

(30) Foreign Application Priority Data

Jun. 28, 2010 (GB) .................................. 1010852.0
Jan. 13, 2011 (GB) .................................. 1100551.9

(51) Int. Cl.
C09K 8/52       (2006.01)
C09K 8/528      (2006.01)
E21B 37/06      (2006.01)

(52) U.S. Cl.
CPC .............. *C09K 8/528* (2013.01); *C09K 8/52* (2013.01); *E21B 37/06* (2013.01)

(58) Field of Classification Search
CPC . C09K 8/52; C09K 8/36; C09K 8/536; C09K 2208/26; C09K 8/575; C09K 8/72; C09K 8/524; C09K 8/34; C09K 8/508; C09K 8/26; C09K 8/528; C09K 8/565; C09K 2208/18; C09K 2208/30; C09K 8/035; C09K 8/74; C09K 2208/08; C09K 8/02; C09K 8/03; C09K 8/40; C09K 8/426; C09K 8/502; C09K 8/506; C09K 8/64; C09K 8/68; C09K 8/516; E21B 43/08; E21B 37/00; E21B 7/00; E21B 33/13; E21B 43/20; E21B 23/06; E21B 33/12; E21B 33/1208; E21B 43/12; E21B 43/267; E21B 37/06; E21B 43/025; Y10S 507/921; Y10S 507/902; Y10S 507/927; Y10S 507/935
See application file for complete search history.

(56) References Cited

U.S. PATENT DOCUMENTS

| | | | |
|---|---|---|---|
| 6,638,896 B1 | 10/2003 | Tibbles et al. | |
| 6,978,838 B2 * | 12/2005 | Parlar | C09K 8/52 166/304 |
| 7,216,705 B2 * | 5/2007 | Saini | C09K 8/68 166/276 |
| 2005/0257932 A1 | 11/2005 | Davidson et al. | |
| 2006/0169182 A1 * | 8/2006 | Todd | C09K 8/10 106/802 |
| 2008/0200354 A1 * | 8/2008 | Jones | C09K 8/524 507/244 |
| 2009/0286701 A1 * | 11/2009 | Davidson | C09K 8/52 507/235 |
| 2010/0323933 A1 * | 12/2010 | Fuller | C09K 8/528 507/261 |

FOREIGN PATENT DOCUMENTS

| | | | |
|---|---|---|---|
| WO | WO2009/137399 | * | 11/2009 |
| WO | 2010053904 A2 | | 5/2010 |
| WO | WO2010/053904 | * | 5/2010 |

OTHER PUBLICATIONS https://en.wikipedia.Org/w/index.php?title=Ethylene_glycol_(data_page)&printable=yes downloaded on Jul. 21, 2016.*
International Search Report for PCT Application Serial No. PCT/GB2011/051199 dated Nov. 7, 2011.

* cited by examiner

*Primary Examiner* — Kumar R Bhushan
(74) *Attorney, Agent, or Firm* — David J. Smith

(57) ABSTRACT

A method of removing a water-based filter cake from a wellbore, the method comprising: contacting the filter cake with a mixture comprising: a non-aqueous, polar solvent; an agent selected to breakdown the filter cake; said mixture comprising <5 wt % water and preferably being essentially anhydrous. The low water content of the mixture actually slows the degradation of the filter cake which has surprisingly been found to be more effective as it allows a more even removal of the filter cake and a more efficient use of the mixture; without the tendency to create local holes in the filter cake where the mixture could escape. Embodiments of the present invention use a polar solvent with a dielectric constant of more than (15), preferably more than (30) such as (15) monoethylene glycol (MEG). In preferred embodiments the agent comprises a salt based on potassium EDTA (ethylenediaminetetraacetic acid).

16 Claims, 1 Drawing Sheet

METHOD OF REMOVING WATER-BASED FILTER CAKE

Figure 1A:
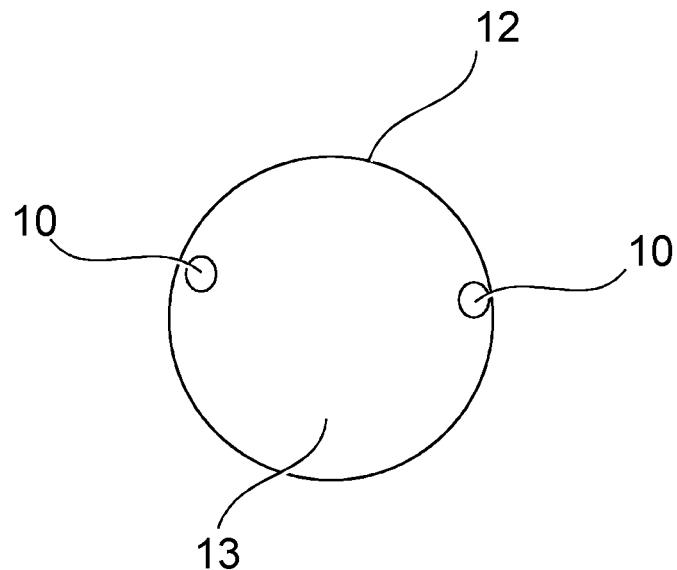

This invention relates to a method of removing water-based filter cake from a wellbore.

When drilling a wellbore, drilling fluid or mud is typically circulated around the drill bit and then back to the surface through the wellbore.

The drilling fluid serves a number of functions including taking heat away from the drill bit and facilitating the return of drill cuttings to the surface. There are three main types of drilling mud, including water; oil; and gaseous-based muds. The present invention deals with the consequences of using water-based drilling muds.

When the hydrostatic pressure of the drilling mud in the wellbore exceeds the inwardly acting pressure of the surrounding formation, the drilling mud is forced into the surrounding formation through the walls of the wellbore. In many applications the drilling mud is intended to be deposited in and/or on the wellbore wall, forming so called "filter cake" which, amongst other things, helps to limit the invasion of formation fluids into the wellbore; reduces the risk of the wellbore collapsing during drilling; and resists the escape of drilling fluids into the formation.

When drilling in highly permeable formations, pore throats between particles of sandstone or other rock particles of the surrounding formation may be blocked using bridging agents added to the drilling mud. The bridging agents are commonly particles with a diameter optimised to bridge the pore throats. Blocking the pore throats encourages formation of filter cake. The bridging agents commonly include particles of calcium carbonate and/or ground cellulose.

Various polymers are also used to help form filter cake and block the pore throats. The polymers normally plug the gaps remaining between the calcium carbonate particles and edges of the pore throat. Filter cake therefore typically comprises a mixture of bridging agents including calcium carbonate and one or more polymers.

After drilling and before production through the wellbore, it is however preferred to remove the filter cake as it would otherwise inhibit the free flow of production fluids into the wellbore.

A number of different chemicals, known as breaker fluids, have been proposed to mitigate or remove one or more components of the filter cake. For example, it is known to use an aqueous solution of sodium-ethylenediaminetetraacetate (sodium-EDTA) which reacts with the calcium carbonate in the filter cake and essentially removes it from the wellbore wall.

For example US2008/0110621 discloses methods of managing lost returns, which includes removing barite from a filter cake using ETDA. On paragraphs 37 and 38 it describes a two step process where butyl glycol changes the wettability of the filter cake and subsequently its permeability is affected by the use of proprietary EDTA mixtures (HDC® MARK II, HDC® D17, HDC XREAM®) all having significant quantities (>30 wt %) of water as a solvent even if they are not further diluted on site. In other portions of this disclosure it is also claimed that the wettability and permeability steps may be done concurrently but no chemistry is disclosed to explain how this may be done, noting that EDTA is not soluble in butyl glycol. Accordingly it is clear that the permeability agents disclosed in US2008/0110621, such as EDTA, use an aqueous solvent.

The inventor of the present invention has noted that the reaction between sodium-EDTA and the various components of filter cake tends to be localised. These reactions thereby create a hole in the filter cake through which the remaining breaker fluid is lost to the formation, thus leaving much of the filter cake intact, inhibiting the flow of fluids into the wellbore during production.

It is an object of the present invention to mitigate or solve a problem with the prior art.

According to a first aspect of the present invention there is provided a method of removing a water-based filter cake from a wellbore, the method comprising:
contacting the filter cake with a mixture comprising:
a non-aqueous, polar solvent; and
an agent selected to breakdown the filter cake
said mixture comprising <5 wt % water.

The non-aqueous polar solvent and the agent selected to breakdown the filter cake are thus contacted with the filter cake as a mixture concurrently Typically the use of such non-aqueous, polar solvents slows the reaction rate of the agent with the filter cake. Thus whilst a skilled person would look to improve the reactivity and/or reaction rate of the agent treating the filter cake, the inventor of the present invention has gone against this teaching by reducing its reactivity and/or reaction rate. This in turn actually provides improved results by allowing the agent to react with the filter cake more slowly and thus more evenly, mitigating loss of the mixture though holes in the filter cake. The use of non-aqueous polar solvents may therefore provide improved remediation of the filter cake compared to use of aqueous solvents.

The mixture may be referred to as a breaker fluid.

Preferably the non-aqueous, polar solvent has a dielectric constant >15, more preferably >30.

Preferably the non-aqueous, polar solvent is oil-soluble.

Typically the mixture comprises <2 wt %, preferably <0.5 wt % water. Preferably therefore the mixture is essentially anhydrous.

Thus embodiments of the invention provide a benefit in that the agent selected to break down the filter cake is not active until it reaches the water based filter cake because contact with water is minimised. In use, this mitigates loss of the agent during transport to the filter cake.

Typically the mixture comprises >50 wt %, preferably between 60 and 70 wt %, and may be >90 wt % non-aqueous polar solvent. Typically the mixture comprises >10 wt %, preferably between 20 and 30 wt % agent.

The non-aqueous, polar solvent is typically an oxygenate. The oxygenate may have an ester group, or an alcohol group, or other oxygenate group. The alcohol group is preferred. Indeed, the oxygenate group preferably comprises a di-alcohol group, typically on adjacent carbon atoms. Preferably therefore the non-aqueous polar solvent comprises a glycol. Suitable glycols include monoethylene glycol (MEG), propylene glycol, glycerine and dimethylene glycol with monoethylene glycol being preferred.

Optionally the non-aqueous, polar solvent is a protic, polyhydroxy solvent such as sorbitol ($C_6H_{14}O_6$).

Preferably the agent comprises a salt, having a cation component $C^+$ and an anion component $A^-$. The cation component may comprise one or more of a Group 1 or 2 metal salt, for example sodium, potassium and calcium. For example, a half salt of calcium and sodium EDTA. Of the Group 1 metals, potassium is especially preferred. The inventor of the present invention has discovered that potassium salts, such as potassium-EDTA, have surprising solubility in non-aqueous polar solvents such as MEG, compared with other metal salts.

There may be between 1 and 4 moles of cation, especially potassium, per mole of anion, especially EDTA. Preferably there is between 2 and 3 moles of cation, especially potassium, per mole of anion, especially EDTA.

Preferably the salt [C$^+$A$^-$] dissolves a portion of the filter cake (which comprises a structure of the form [c$^+$a$^-$]) to form complexes [C$^+$a$^-$] and [c$^+$A$^-$]. For example, when using potassium EDTA on the filter cake comprising calcium carbonate, the calcium carbonate may be dissolved by the potassium EDTA and thereby organic complexes of calcium EDTA and potassium carbonate may be formed.

When using a non-aqueous polar solvent, with or without further additives, the breaker fluid preferably becomes progressively more active as it becomes diluted with water. The increase in water content may occur as the breaker fluid penetrates through the filter cake and/or formation and/or as the non-aqueous polar solvent dehydrates and denatures polymers in the filter cake, causing them to be less gelatinous in nature so providing less of a barrier to the flow of fluids into the wellbore. The non-aqueous polar solvent may help reduce the state of hydration of the polymer.

The water-based filter cake was created by a water based drilling mud.

Oxidisers may be added to the mixture. An oxidiser in this context is an oxygenation agent, a substance that donates oxygen to a substrate, such as the filter cake.

The oxidiser is preferably relatively mild. Such oxidisers are safer to transport, store and use as well as be less likely to react prematurely in use. Thus preferably the oxidiser comprises urea peroxide or an oxidiser included in the list of class 1 oxidizers published by the National Fire Protection Association (www.nfpa.org) also available at http://safety-.science.tamu.edu/oxidizers.html.

The oxidisers may in particular be one or more from the following list (at any concentration unless otherwise stated): urea peroxide, aluminum nitrate, potassium dichromate, ammonium persulfate, potassium nitrate, barium chlorate, potassium persulfate, barium nitrate, silver nitrate, barium peroxide, sodium carbonate peroxide, calcium chloride, sodium dichloro-s-triazinetrione, calcium nitrate, sodium dichromate, calcium peroxide, sodium nitrate, cupric nitrate, sodium nitrite, hydrogen peroxide at a concentration of between 8 and 27.5%, sodium perborate, lead nitrate, sodium perborate tetrahydrate, lithium hypochlorite, sodium perchlorate monohydrate, lithium peroxide, sodium persulfate, magnesium nitrate, strontium chlorate, magnesium perchlorate, strontium nitrate, magnesium peroxide, strontium peroxide, nickel nitrate, zinc chloride, nitric acid at a concentration of less than 70%, perchloric acid at a concentration of less than 60% and zinc peroxide.

Peroxides are preferred such as one or more chosen from the following list (at any concentration unless otherwise stated): urea peroxide, potassium ammonium persulfate, potassium persulfate, barium peroxide, sodium carbonate peroxide, calcium peroxide, hydrogen peroxide at a concentration of between 8 and 27.5%, sodium perborate, sodium perborate tetrahydrate, sodium perchlorate monohydrate, lithium peroxide, sodium persulfate, magnesium perchlorate, magnesium peroxide, strontium peroxide, perchloric acid at a concentration of less than 60% and zinc peroxide.

Particularly suitable oxidisers include one or more of urea peroxide, magnesium peroxide and sodium perborate.

Typically the oxidiser comprises 0.4-0.6% w/v, especially around 0.5% w/v of the mixture.

Enzymes may be added to the mixture and may be one or more of those found in any commercially available biological detergent. Suitable enzymes include an amylase based enzyme, a lipase based enzyme, a cellulose based enzyme and preferably α-Amylase. Typically the enzyme comprises 0.1% w/v of the mixture.

Oxidisers and/or enzymes may be added to the mixture to target the removal of polymers from the filter cake.

The thermal limit at which the breaker fluid functions is increased when using a non-aqueous, polar solvent, such as MEG, compared to water.

Without wishing to be bound by theory, oxidisers and enzymes are thought to break down polymers present in the filter cake. Indeed, one benefit of including oxidisers such as peroxide with the non-aqueous solvent mixture, as opposed to an aqueous mixture, is that it the additives may remain relatively stable and inactive in the mixture, in accordance with the invention, before reaching a zone in the filter cake or formation where dilution with water can occur. The water may be associated with hydrated polymers within the filter cake.

The agent selected to breakdown the filter cake may be any agent known for such a purpose. The agent may be a chelant. A chelant is a chemical that forms soluble, complex molecules with certain metal ions, inactivating the ions so that they cannot normally react with other elements or ions to produce precipitates or scale. For example, ethylenediaminetetraacetic acid (EDTA); ethylenediamine tetra-methylene phosphonic acid (EDTMP); diethylenetriaminepentaacetic acid (DTPA); N(hydroxyethyl) ethylenediaminetriacetic acid (HEDTA); nitrilotriacetic acid (NTA); ethylenediamine-N,N'-disuccinic acid (EDDS); glycol-bis(2-aminoethylether)-N,N,N',N'-tetraacetic acid; 1,2-bis(o-aminophenoxy)ethane-N,N,N',N'-tetraacetic acid; iminodisuccinate acid; L-glutamic acid N,N-diacetic acid (GLDA); and methylglycinediacetic acid.

The chelant may be used in its acidic form and more specifically in one or more of a potassium, ammonium, sodium, calcium or lithium form. The chelant typically helps to break down the calcium carbonate.

The dissolution of the chelant may be slower in a non-aqueous solvent compared to an aqueous solvent due to weaker ionic interactions. In situ, this normally gives the breaker fluid greater contact time with the filter cake and a more even treatment before the breaker fluid breaks through the filter cake and leaks-off into the formation. The non-aqueous solvents typically change the hydrated state of the polymers in the filter cake thereby reducing their capacity to form a gel barrier that blocks flow paths into the wellbore.

Optionally the mixture further comprises a hydrolysable ester which, when in contact with water, hydrolyses to release acid. The acid dissolves the filter cake and so avoids the contact of acid with up-stream components. The hydrolysable ester delays break through of the filter cake, improving the treatment of the filter cake.

For example polyglycolic acid and/or polylactic acid may be added to the treatment fluid to provide a delayed increase in the local concentration of hydrogen ions. The polyglycolic acid and/or polylactic acid may hydrolyse to yield acid that helps dissolve the calcium carbonate in the filter cake.

The mixture may form part of an emulsion. The mixture may form either the continuous or discontinuous phase of the emulsion and so droplets of non-aqueous polar solvent and agent may be dispersed in oil or droplets of oil may be dispersed in the non-aqueous polar solvent and agent.

Embodiments of the present invention will now be described by way of example only and with reference to and as shown in the accompanying FIG. 1b, which is an image of the leak-off test results using K2.2 EDTA.

Dissolution of Calcium Carbonate

Tests were carried out to ascertain the effectiveness of the various breaker fluids in breaking down samples of calcium carbonate. The filter cake formed downhole when drilling mud contacts the reservoir formation on the edge of the wellbore, comprises calcium carbonate. The effect of the various breaker fluids on calcium carbonate was therefore tested using an agent selected to breakdown the filter cake in a non-aqueous solution, which is monoethylene glycol (MEG) in accordance with the present invention, and in an aqueous solution for comparison.

The use of aqueous sodium-ethylenediaminetetraacetate (sodium-EDTA) is known to be effective in the remediation of calcium carbonate in filter cake. It is also known that the solubility of sodium-EDTA is generally poor in non-polar solvents such as monoethylene glycol (MEG). Surprisingly however, potassium-EDTA was found to have good solubility in non-polar solvents such as MEG. Tests were therefore undertaken using potassium-EDTA in MEG and separately in water.

The test used the following procedure: 5 ml of the breaker fluid containing potassium-EDTA was added to a vial to which 0.1 g calcium carbonate was added, the contents of the vial were then aged at 70° C. and observations made after 30 minutes and 24 hours.

The results showed that after 30 mins at 70° C., the samples of calcium carbonate had been broken down by the potassium-EDTA in fresh water. After 24 hrs the potassium-EDTA in MEG had not dissolved all of the calcium carbonate. The pH of the sample in MEG was 7; the pH of the sample in aqueous solution was 4.7.

The rate of breakdown of the calcium carbonate by the potassium-EDTA breaker fluid using MEG was shown to be slower than that using fresh water. This shows that the potassium-EDTA breaker fluid using MEG would more slowly and controllably dissolve the calcium carbonate bridging solids in the filter cake compared to the potassium-EDTA using fresh water. Rapid dissolution of the calcium carbonate in the filter cake causes the breaker fluid to leak-off into the formation without treating the entire filter cake.

Production of Filter Cakes

Filter cakes were produced in the laboratory to provide an experimental substitute for the filter cakes produced in a wellbore. The filter cakes were produced on 60 micron pore size (to air) ceramic discs made from aluminium oxide ($Al_2O_3$) as an approximation to the sandstone of a typical rock formation. The aluminium oxide disc was soaked in brine (or sea water) and loaded into a cell. Drilling fluid was then added to the cell, the cell and its contents heated to 75° C., and put under 500 psi differential pressures to push the drilling fluid through the filter cake. The composition of the drilling fluid is outlined below in Table 1.

After formation of the filter cake the cell was emptied, whilst still warm, to ensure efficient removal of the drilling fluid as it was less gelled when it was warm compared to when it was cold.

Thick filter cakes were produced and tested, as opposed to thin, to try to overcome any defects in thin filter cakes that might give erroneous results and to try to give greater differentiation between the systems. It was considered that this would be a closer representation of an actual filter cake formed in a wellbore. The thick filter cakes were produced over a period of 2 hrs until approximately 20 ml of filtrate had been collected.

Table 1 shows the composition of the drilling fluid used in the production of the filter cakes.

TABLE 1 formulation of the drilling fluid for the leak-off tests

| Material | Function | (g) | (~ml) |
|---|---|---|---|
| Fresh water | Aqueous base fluid | 323 | 323 |
| Potassium Chloride | Shale hydration inhibitor | 27 | 10 |
| Fine Calcium Carbonate (SIRN 2007-8536) | Acid soluble bridging solid | 27 | 10 |
| FLO-TROL | Starch based filtration control polymer | 4 | 2 |
| BIOVIS | Scleroglucan based viscosifier | 2 | 4 |
| Mg Oxide | pH buffer | 1 | 0.5 |
| SAFECIDE | Biocide | 0.2 | 0.2 |
| DEFOAMER | | 0.2 | 0.2 |

The drilling fluid normally comprises a bridging agent including one or more of calcium carbonate (chalk, dolomite, limestone); barium sulphate (barite); hematite; ferrous carbonate; magnesium carbonate; and manganese tetroxide.

Pore throats between particles of sandstone or other rock particles of the formation surrounding the wellbore may be blocked using the bridging agents.

The drilling fluid may further comprise one or more additives or polymers including bentonite; natural polymers; synthetic polymers; asphalt; and gilsonite. For water based fluids the polymer may be a water-swellable polymer. The additives or polymers may help formation of the filter cake by blocking the pore throats. The polymers normally plug the gaps between the bridging agent, for example calcium carbonate particles, and the edges of the pore throat. Polymers typically used to perform this function include derivatives of carboxymethylcellulose (CMC); polyanionic cellulose (PAC); and starch.

When using a water based drilling mud the water can interact or react with the water-swellable polymer to help block the gaps between the calcium carbonate particles. When the drilling fluid is oil based, the droplets of brine emulsion dispersed within the continuous oil phase perform a function similar to that of using a polymer in a water based fluid and thereby reduce loss of fluid to the formation.

The drilling fluid may yet further comprise a thickener, added to alter the viscosity of the mixture. These thickeners are typically polysaccharide biopolymers derived from microorganisms such as xanthan gum; scleroglucan gum and welan gum. Deflocculants may be used to reduce the viscosity of the mixture. These deflocculants are typically an anionic polyelectrolyte and may comprise one or more of an acrylate; polyphosphate; lignosulfonates; and a tannic acid derivative.

Leak-Off Testing

Remediation or breakdown of a filter cake using the various breaker solutions, for example potassium-EDTA, comprising the various solvents, for example MEG, was used as an indication of the effectiveness of the said breaker solution to remediate or breakdown a filter cake produced in a wellbore.

For each leak-off test a filter cake was loaded into a cell and a volume of breaker solution carefully added around the top edge of the cell to avoid damaging the filter cake. The cell was then sealed and heated to 75° C. and the leak-off of breaker solution through the filter cake measured against time at 100 psi differential pressure. A volume of trapped nitrogen was used to maintain pressure in the cell.

Leak-Off Test Results Using K2.2 EDTA

A leak-off test, as described above, was undertaken using K2.2 EDTA at a concentration of approximately 44% w/w solubilised in MEG and, separately in water. Greater quantities of the K2.2 EDTA were only soluble in MEG when the temperature was increased and the pH was not strongly alkaline. It was realised that since the K2.2 EDTA became more soluble at higher temperatures, this property could be used as another means for delaying the dissolution of the bridging solids, leading to a more even breakdown of the filter cake.

Table 2 lists the various materials in the breaker fluid used for the leak-off tests.

TABLE 2 formulation of the breaker fluid for the leak-off tests using K2.2 EDTA

| Material | (g or ml) | (Mol) | ~% w/w |
|---|---|---|---|
| MEG or fresh water | 100 ml | | 56.5 |
| Potassium Hydroxide | 24 | 0.4 | 13.6 |
| EDTA (acid form) | 53 | 0.18 | 29.9 |

Figure 1B:
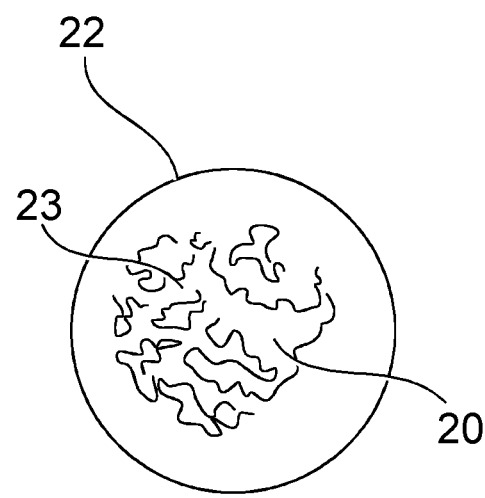

The results of the leak-off tests are shown in Table 3 and FIGS. 1a and 1b.

TABLE 3 leak-off test results using K2.2 EDTA

| Sample | Fluid Loss Test 60 mic disc, 75° C., 500 psi (mls) | Leak-Off Test (100 psi, 75° C.) | | | | pH of Filtrate |
|---|---|---|---|---|---|---|
| | | 48 minutes (mls) | 55 minutes (mls) | 110 minutes (mls) | 16 hrs. Shut in (mls) | |
| ~44% w/w K2.2 EDTA in MEG | 20.5 | 0.5 | 0.5 | 1.0 | Total on restart | 5.1 |
| ~44% w/w K2.2 EDTA in Water | 20 | 3.5 | Total | — | — | 4.2 |

From the results it can be seen that the aqueous solubilised K2.2 EDTA solution broke through the filter cake more rapidly (at 55 minutes) compared to the corresponding MEG solubilised solution.

From FIG. 1a it can be seen that the aqueous solubilised K2.2 EDTA solution leaked-off through two pin holes, or hot spots 10, at the edge of the disc 12 leaving the remaining filter cake 13 in place. In contrast, the MEG solubilised treatment had not broken through even after double this length of time (110 minutes). After 110 minutes the cell was "shut in" or sealed so that the MEG based solution was trapped and the pressure maintained so that further leak-off could not occur. After approximately 16 hours the cell was reopened and rapid leak-off was observed. On removal of the filter cake it was observed for certain embodiments of the present invention as shown in FIG. 1b, that a large amount of the filter cake 23 had dissolved 20, compared to using the aqueous based K2.2 EDTA control solution outwith the scope of the present invention, as shown in FIG. 1a.

Thus the test demonstrated that rapid leak-off was delayed if the chelant (EDTA) was applied in a non-aqueous solution.

Leak-Off Results Using K3 EDTA & K4 EDTA

A leak-off test, as described above, was undertaken using a K3 & K4 EDTA solubilised breaker solution in non-aqueous solvents in accordance with an embodiment of the present invention and separately in aqueous solvent for comparison. Table 4 lists the various materials in the K3 EDTA breaker solution and Table 5 lists the various materials in the K3 EDTA breaker solution used for the leak-off tests.

The samples prepared using MEG were warmed to approximately 50° C. on a magnetic hotplate to facilitate solubilisation of the EDTA salts. The leak-off method used was the same as that outlined above for K2.2 EDTA, with the optimisations previously described included.

TABLE 4 formulation of the K3 EDTA breaker solution

| Material | (g or ml) | (Mol) | ~% w/w |
|---|---|---|---|
| MEG or fresh water | 75 ml | | 68.5 |
| Potassium Hydroxide | 4.2 | 0.08 | 3.8 |
| K2 EDTA | 30.3 | 0.08 | 27.7 |

TABLE 5 formulation of the K4 EDTA breaker solution

| Material | (g or ml) | (Mol) | ~% w/w |
|---|---|---|---|
| MEG or fresh water | 75 ml | | 66.0 |
| Potassium Hydroxide | 8.4 | 0.16 | 7.4 |
| K2 EDTA | 30.3 | 0.08 | 26.6 |

The results of the leak-off tests are shown in Table 6.

TABLE 6 leak-off test results using K3 EDTA & K4 EDTA

| Sample | Fluid Loss Test 60 mic, 75° C., 500 psi (mls) | Leak-Off Test (100 psi, 75° C.) | | | | | pH of Filtrate |
|---|---|---|---|---|---|---|---|
| | | 32 min (mls) | 60 min (mls) | 255 min (mls) | 295 min (mls) | 343 min (mls) | +14 hrs (mls) | |
| ~31.5% w/w K3 EDTA in MEG | 23 | 3 | 3.5 | 7.5 | 12 | 52 | Total | 8 |

TABLE 6-continued leak-off test results using K3 EDTA & K4 EDTA

| Sample | Fluid Loss Test 60 mic, 75° C., 500 psi (mls) | Leak-Off Test (100 psi, 75° C.) | | | | | pH of Filtrate |
|---|---|---|---|---|---|---|---|
| | | 32 min (mls) | 60 min (mls) | 255 min (mls) | 295 min (mls) | 343 min (mls) | +14 hrs (mls) | |
| ~31.5% w/w K3 EDTA in Water | 23 | 1.5 | Total | — | — | — | — | 7.6 |

The polymers are less hydrated after being exposed to the K3 or K4 EDTA solubilised in MEG compared to the corresponding potassium EDTA salts solubilised in water.

The leak-off results show that the aqueous based K3 EDTA solution broke through the filter cake between 30 and 60 minutes, whereas the K4 EDTA took between 5 and 19 hours. The aqueous solutions leave a thick layer of gelled polymer on the disc, and provide only localised removal of the bridging solids compared to the more thorough treatment and removal with the chelant solutions in MEG.

Experimental results using 34% w/w K4 EDTA in MEG and separately, in water, were inconclusive on breakthrough time, it is thought due to variations in pH. Nevertheless, the samples treated using MEG were observed to be more dehydrated than the samples treated using water; thus still demonstrating an improved effect for the MEG embodiment within the scope of the present invention compared with the water based comparative example.

Thus, our research demonstrates that it is an advantage of certain embodiments of the present invention that even with un-optimised MEG solubilised breaker fluid, the use of non-aqueous salt solutions can be used to give a more even and/or thorough breakdown of the filter cake compared to using aqueous solutions.

Leak-Off Results Using Potassium EDTA Salts & Oxidiser

After both treatments some of the polymer, that comprises part of the filter cake, was left intact. This could block pore throats and act as a barrier to restrict the flow of liquids through the filter cake. To overcome this potential problem the inventor tried incorporating polymer breakers into the MEG solubilised breaker fluid in addition to the chelant.

Tests were performed using various potassium EDTA and oxidiser combinations as detailed below to investigate if polymers in the filter cake could be degraded as well as the bridging solids, as it had been determined from the previous test series that this could be a further enhancement.

Tests were carried out using the oxidisers sodium perborate and urea peroxide. For the tests with sodium perborate the solutions were prepared with K4 EDTA as it was observed that the perborate only became soluble under more alkaline conditions. For the tests with urea peroxide, which has a higher solubility in MEG, K3 EDTA was used as it has a lower pH than K4 EDTA which was hoped to increase the stability of the peroxide ion in solution.

Tables 7 to 10 list the various materials in the breaker solution used and results of the leak-off tests.

TABLE 7 formulation of the K4 EDTA & sodium perborate breaker solution

| Material | (g or ml) | (Mol) | ~% w/w |
|---|---|---|---|
| MEG or fresh water | 100 ml | | 76 |
| Potassium Hydroxide | 12 | 0.2 | 9.1 |
| EDTA (acid form) | 14.5 | 0.05 | 11 |
| Sodium Perborate | 5 | | 3.8 |

TABLE 8 leak-off test results using K4 EDTA & sodium perborate

| Sample | Fluid Loss Test 60 mic, 75° C., 500 psi (mls) | Leak-Off Test (100 psi, 75° C.) | | | | | pH of Filtrate |
|---|---|---|---|---|---|---|---|
| | | 30 minutes (mls) | 60 minutes (mls) | After 16 hrs. Shut in (mls) | +40 minutes (mls) | | |
| ~20% w/w K4 EDTA in MEG + Na Perborate | 22 | 1 | 1 | Drops | Total | | 9.8 |
| ~20% w/w K4 EDTA in Water + Na Perborate | 17.5 | 3 | Total | — | — | | 10.4 |

The results shown in Table 8 show that the addition of the oxidiser sodium perborate to the 20% w/w K4 EDTA aq. treatment solution reduced the break through, or leak-off time through the filter cake, which broke in approximately 60 minutes compared to an equivalent result without the oxidiser sodium perborate. This demonstrates how much the flow of fluids through the filter cake is restricted by the polymers alone. These results show that if the polymers in the cake are degraded sufficiently by an oxidiser, then rapid leak-off of the treatment fluid can occur, even if the bridging solids remain un-dissolved. The results also highlight that only a small amount of oxidiser is required to cause premature break through of the filter cake even if the chelant level is low and so care has to be taken with their use. In contrast, it can be seen that the corresponding MEG solubilised treatment had not leaked-off after 1 hour.

The filter cake treated with the MEG solubilised breaker fluid showed polymers that are dark brown or burnt in colour. These polymers have therefore been degraded to a greater extent than those treated with the aqueous solubilised breaker fluid. Also the extended contact time has facilitated greater dissolution of the bridging solids, which has resulted in a thinner filter cake after treatment.

TABLE 9 formulation of the K3 EDTA & urea peroxide breaker solution

| Material | (g or ml) | (Mol) | ~% w/w | (g or ml) | (Mol) | ~% w/w |
|---|---|---|---|---|---|---|
| MEG or fresh water | 150 ml | | 75.2 | 150 ml | | 74 |
| Potassium Hydroxide | 5.6 | 0.1 | 2.8 | 5.6 | 0.1 | 2.8 |
| K2 EDTA | 40.6 | 0.1 | 20.4 | 40.6 | 0.1 | 20 |
| Urea Peroxide | 3.3 | | 1.7 | 6.6 | | 3.3 |

TABLE 10 leak-off test results using K3 EDTA & urea peroxide

| Sample | Fluid Loss Test 60 mic, 75° C., 500 psi (mls) | Leak-Off Test (100 psi, 75° C.) | | | | | pH of Filtrate |
|---|---|---|---|---|---|---|---|
| | | 15 mins (mls) | 30 mins (mls) | 70 mins (mls) | 135 mins (mls) | 194 mins (mls) | |
| ~23% w/w K3 EDTA in MEG + 1.7% w/w Urea Peroxide | 21.5 | 3 | 12 | — | 36 | 69 | 8 |
| ~23% w/w K3 EDTA in MEG + 3.3% w/w Urea Peroxide | 22.5 | 9.5 | 14.5 | — | Total | — | 7.1 |
| ~23% w/w K3 EDTA in Water + 1.7% w/w Urea Peroxide | 26 | Instant break through | — | — | — | — | 7.1 |
| ~23% w/w K3 EDTA in Water + 3.3% w/w Urea Peroxide | 26 | — | — | Break through | — | — | 6.9 |

The results presented in table 10 using the urea peroxide containing breaker solution clearly show, that at a lower pH level the peroxide is much more active, which results in very rapid break through with the aqueous solubilised treatments.

However, the trends are the same as those described previously whereby the MEG solubilised breaker fluid are slower, which results in more uniform treatment of the filter cake.

Leak-Off Test Results Using Potassium EDTA Salts & Enzyme

The purpose of these tests was to see if an enzyme, specifically a solid, α-Amylase enzyme in powder form, could be used to degrade the starch based polymer (FLO-TROL) in the filter cake. Tests were performed as detailed above using the drilling fluid formulation given in Table 1 and the breaker fluid detailed below in Table 11. The results are given in Table 12.

TABLE 11 formulation of the K3 EDTA & enzyme breaker solution

| Material | (g or ml) | (Mol) | ~% w/w |
|---|---|---|---|
| MEG or fresh water | 75 ml | | 68.5 |
| Potassium Hydroxide | 4.2 | 0.075 | 3.8 |
| K2 EDTA | 30.3 | 0.075 | 27.7 |
| Alpha Amylase (solid) | 0.2 | | 0.18 |

TABLE 12 leak-off test results using K3 EDTA & enzyme

| Sample | Fluid Loss Test 60 mic, 75° C., 500 psi (mls) | Leak-Off Test (100 psi, 75° C.) | | | | | | pH of Filtrate |
|---|---|---|---|---|---|---|---|---|
| | | 32 mins (mls) | 60 mins (mls) | 182 mins (mls) | 296 mins (mls) | 403 mins (mls) | ~71 hrs (mls) | |
| ~31.5% w/w K3 EDTA in MEG | 23 | 2.5 | — | 2.5 | 2.5 | 2.5 | Total | 8.3 |
| ~31.5% w/w K3 EDTA in Water | 22.5 | 3 | — | 6.5 | 8 | 9.5 | Total | 8.6 |
| ~31.5% w/w K3 EDTA in MEG + | 22.5 | 2.5 | — | 10 | 29 | 60 | Total | 8.0 |

TABLE 12-continued leak-off test results using K3 EDTA & enzyme

| Sample | Fluid Loss Test 60 mic, 75° C., 500 psi (mls) | Leak-Off Test (100 psi, 75° C.) | | | | | |
|---|---|---|---|---|---|---|---|
| | | 32 mins (mls) | 60 mins (mls) | 182 mins (mls) | 296 mins (mls) | 403 mins (mls) | ~71 hrs (mls) | pH of Filtrate |
| 0.18% w/w Amylase ~31.5% w/w K3 EDTA in Water + 0.18% w/w Amylase | 22 | 3 | Total | — | — | — | — | 7.5 |

The results in Table 12 highlight some surprising findings. Firstly, there is the effect on leak-off time of adding alpha amylase enzyme to the breaker fluid. Using breaker fluid solubilised in either water or MEG the leak-off time is greatly reduced compared to the control without the addition of an enzyme. By adding enzyme to the water solubilised breaker fluid, the breakthrough time was less than 1 hour compared to >7 hours for the control without enzyme. Likewise for the MEG solubilised breaker fluid, adding enzyme reduced breakthrough time compared to the benchmark without enzyme, but it was still much slower than the water solubilised breaker fluid, giving the MEG solubilised treatment fluid more time to fully react with the filter cake.

From a visual assessment of the samples both the MEG solubilised fluids dehydrated and denatured the polymers in the filter cake to a greater extent than the water solubilised fluids. In the case of the filter cakes exposed to the aqueous treatments, it was observed that hot spots were created around the edge of the disc, whereas the treatment with the MEG solubilised fluids was more uniform over the surface of the disc with no visible sign of areas for preferential leak-off.

The treatment of the discs by the various fluids demonstrated the occurrence of both physical and chemical reactions. Changes to the polymer were physical rather than chemical or reactive. It was observed that the polymers physical state changed during treatment as the polymer became dehydrated and dried out. These results demonstrate that amylase can function in a MEG solubilised breaker fluid and can be used to degrade polymers in the filter cake whilst retaining reasonable leak-off times that enable thorough remediation of the filter cake.

More generally it is an advantage of certain embodiments of the present invention that the stability of the peroxides and/or enzymes can be increased in a non-aqueous environment. The peroxides and/or enzymes therefore last longer at typical wellbore temperatures and function at higher than normal temperatures. Also, by solubilising the breaker fluid in a glycol, the reaction can be targeted to specific areas in the filter cake, such as the zones with higher water content, as is found bound up with the gelled and hydrated polymers.

The invention claimed is:

1. A method comprising:
   removing a water-based filter cake from a wellbore by contacting the water-based filter cake in the wellbore with a mixture comprising:
   a non-aqueous, polar glycol solvent;
   a chelant, wherein the chelant comprises an ethylenediaminetetraacetic acid having 3 to 4 moles of cations per mole of the chelant; and
   one or more agents selected from the group consisting of oxidizer and enzymes;
   wherein the mixture comprises <5 wt % water; and
   wherein the mixture comprises >50 wt % non-aqueous, polar glycol solvent.

2. The method of claim 1, wherein the mixture comprises <2 wt % water.

3. The method of claim 1, wherein the mixture comprises >90 wt % non-aqueous, polar glycol solvent.

4. The method of claim 1, wherein the dielectric constant of the non-aqueous, polar glycol solvent is at least 30.

5. The method of claim 1, wherein the non-aqueous, polar glycol solvent comprises at least one of monoethylene glycol (MEG), propylene glycol, glycerine and dimethylene glycol.

6. The method of claim 1, wherein the 3 to 4 moles of cations are potassium.

7. The method of claim 1, wherein the chelant further comprises one or more selected from the group consisting of ethylenediaminetetraacetic acid (EDTA); ethylenediamine tetra-methylene phosphonic acid (EDTMP); diethylenetriaminepentaacetic acid (DTPA); N (hydroxyethyl) ethylenediaminetliacetic acid (HEDTA); nitrilotriacetic acid (NTA); ethylenediamine-N,N'-di succinic acid (EDDS); glycol-bis (2-aminoethylether)-N,N,N',N'-tetraacetic acid; 1,2-bis(o-aminophenoxy)ethane-N,N,N',N'-tetraacetic acid; iminodi succinate acid; L-glutamic acid N,N-diacetic acid (GLDA); and methylglycinediacetic acid (MGDA).

8. The method of claim 1, wherein the nonaqueous, polar glycol solvent comprises monoethylene glycol (MEG), and the agent comprises ethylenediaminetetraacetic acid (EDTA).

9. The method of claim 1, wherein the one or more agents comprise one or more oxidizers selected from the group consisting of: urea peroxide, aluminum nitrate, potassium dichromate, ammonium persulfate, potassium nitrate, barium chlorate, potassium persulfate, barium nitrate, silver nitrate, barium peroxide, sodium carbonate peroxide, calcium chlorate, sodium dichloro-s-triazinetrione, calcium nitrate, sodium dichromate, calcium peroxide, sodium nitrate, cuptic nitrate, sodium nitrite, hydrogen peroxide at a concentration of between 8 and 27.5%, sodium perborate, lead nitrate, sodium perborate tetrahydrate, lithium hypochlorite, sodium perchlorate monohydrate, lithium peroxide, sodium persulfate, magnesium nitrate, strontium chlorate, magnesium perchlorate, strontium nitrate, magnesium peroxide, strontium peroxide, nickel nitrate, zinc chlorate, nitric acid at a concentration of less than 70%, perchloric acid at a concentration of less than 60% and zinc peroxide.

10. The method of claim 1, wherein the one or more agents comprise one or more oxidizers selected from the group consisting of: urea peroxide, potassium ammonium persulfate, potassium persulfate, barium peroxide, sodium carbonate peroxide, calcium peroxide, hydrogen peroxide at a concentration of between 8 and 27.5%, sodium perborate, sodium perborate tetrahydrate, sodium perchlorate monohydrate, lithium peroxide, sodium persulfate, magnesium perchlorate, magnesium peroxide, strontium peroxide, perchlotic acid at a concentration of less than 60% and zinc peroxide.

11. The method of claim 10, wherein the one or more oxidizers are selected from the group consisting urea peroxide, magnesium peroxide and sodium perborate.

12. The method of claim 1, wherein the mixture further comprises a hydrolysable ester.

13. The method of claim 12, wherein the hydrolysable ester comprises at least one of a polyglycolic acid and a polylactic acid.

14. A method comprising:
removing a water-based filter cake from a wellbore by contacting the water-based filter cake in the wellbore with a mixture comprising:
a non-aqueous, polar glycol solvent;
a chelant selected to breakdown the water-based filter cake and comprising a salt, having a cation component and an anion component; and
one or more agents selected from the group consisting of oxidizer and enzymes;
wherein the mixture comprises >50 wt % non-aqueous, polar glycol solvent and is essentially anhydrous.

15. The method of claim 14, wherein the mixture has no added water.

16. The method of claim 14, wherein the chelant comprises an ethylenediaminetetraacetic acid having 3 to 4 moles of cations per mole of the chelant.

* * * * *